United States Patent
Dong et al.

(10) Patent No.: US 12,237,913 B2
(45) Date of Patent: Feb. 25, 2025

(54) WAVELENGTH-DIVISION-MULTIPLEXING OPTICAL CIRCUIT IMPLEMENTED IN PHOTONIC INTEGRATED CIRCUIT FOR OPTICAL TRANSMITTER

(71) Applicant: II-VI DELAWARE, INC., Wilmington, DE (US)

(72) Inventors: Po Dong, Morganville, NJ (US); Argishti Melikyan, Marlboro, NJ (US)

(73) Assignee: II-VI DELAWARE, INC., Wilmington, DE (US)

( * ) Notice: Subject to any disclaimer, the term of this patent is extended or adjusted under 35 U.S.C. 154(b) by 153 days.

(21) Appl. No.: 17/590,959

(22) Filed: Feb. 2, 2022

(65) Prior Publication Data
US 2023/0246725 A1    Aug. 3, 2023

(51) Int. Cl.
| H04J 14/02 | (2006.01) |
| H04B 10/50 | (2013.01) |
| H04B 10/516 | (2013.01) |
| H04J 14/06 | (2006.01) |

(52) U.S. Cl.
CPC ........ *H04J 14/0205* (2013.01); *H04B 10/503* (2013.01); *H04B 10/516* (2013.01); *H04J 14/0216* (2013.01); *H04J 14/06* (2013.01)

(58) Field of Classification Search
None
See application file for complete search history.

(56) References Cited

U.S. PATENT DOCUMENTS

| 7,302,181 | B2* | 11/2007 | Ng | H01L 25/0753 |
| | | | | 257/E33.059 |
| 9,225,454 | B1* | 12/2015 | Liu | H04J 14/02 |
| 2004/0208644 | A1* | 10/2004 | Sirat | H04B 10/506 |
| | | | | 398/186 |
| 2022/0149967 | A1* | 5/2022 | Ferrari | H04B 10/25137 |

* cited by examiner

*Primary Examiner* — David W Lambert
(74) *Attorney, Agent, or Firm* — Blank Rome LLP

(57) ABSTRACT

An optical circuit is used with continuous wave signals having different wavelengths at a channel spacing from one another. A portion of the optical circuit is implemented in a photonic integrated circuit. Modulators in a modulation stage modulate the continuous wave signals to produce modulated signals. A multiplexing stage, which can have multiplexing filters, power combiners, or power couplers, multiplexes the continuous wave or modulated signals to produce multiplexed signals. The multiplexing stage may be placed either before or after the modulation stage. One or more polarization rotator and combiner (PRC) devices in a final stage combines the multiplexed signals into an output signal. The output signal has a first set of the different wavelengths at a first polarization and has a second separate set of the different wavelengths at a second polarization orthogonal to the first polarization.

15 Claims, 4 Drawing Sheets

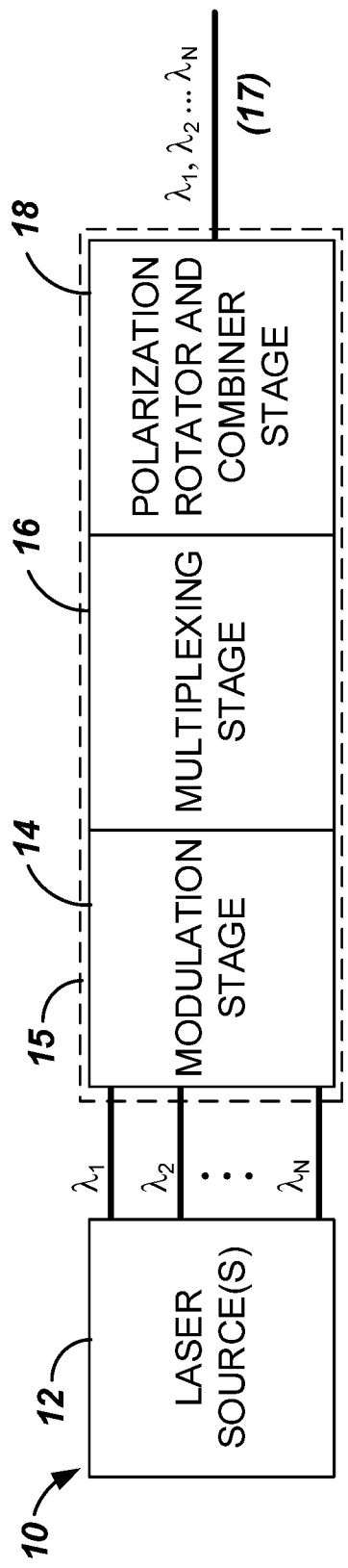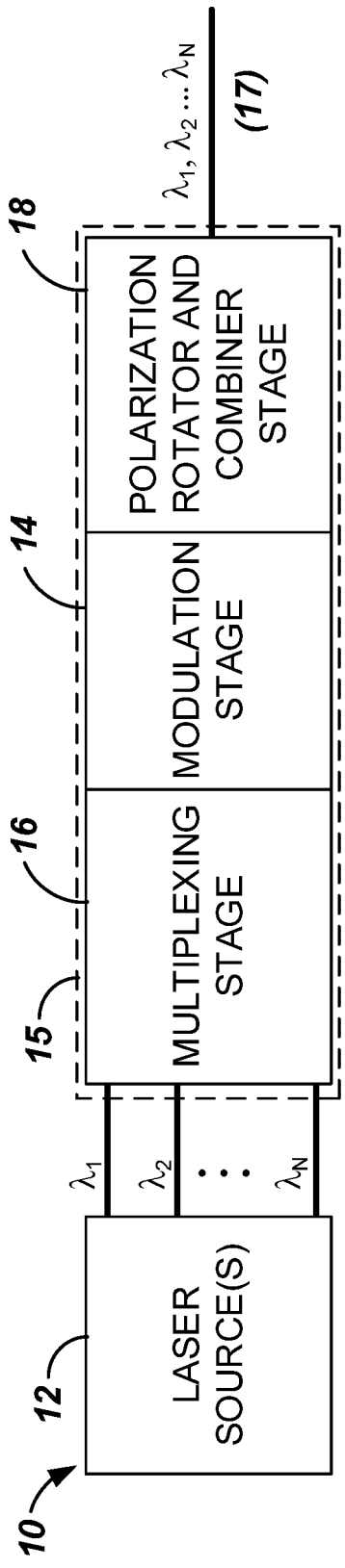

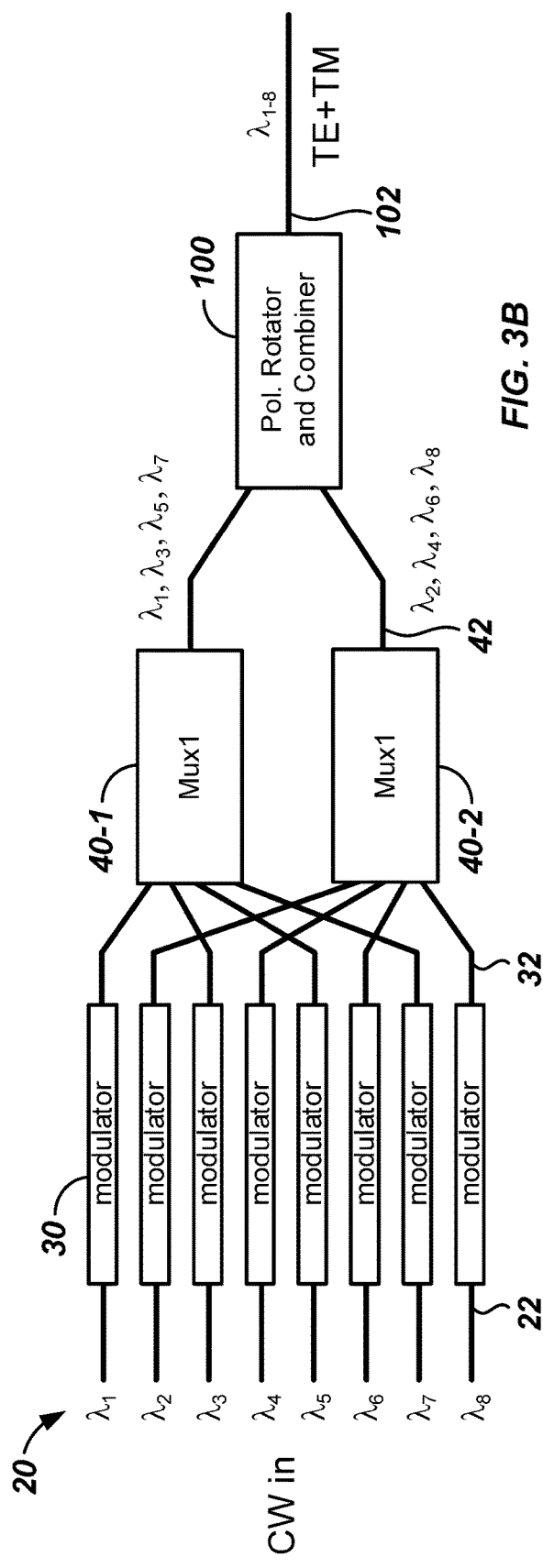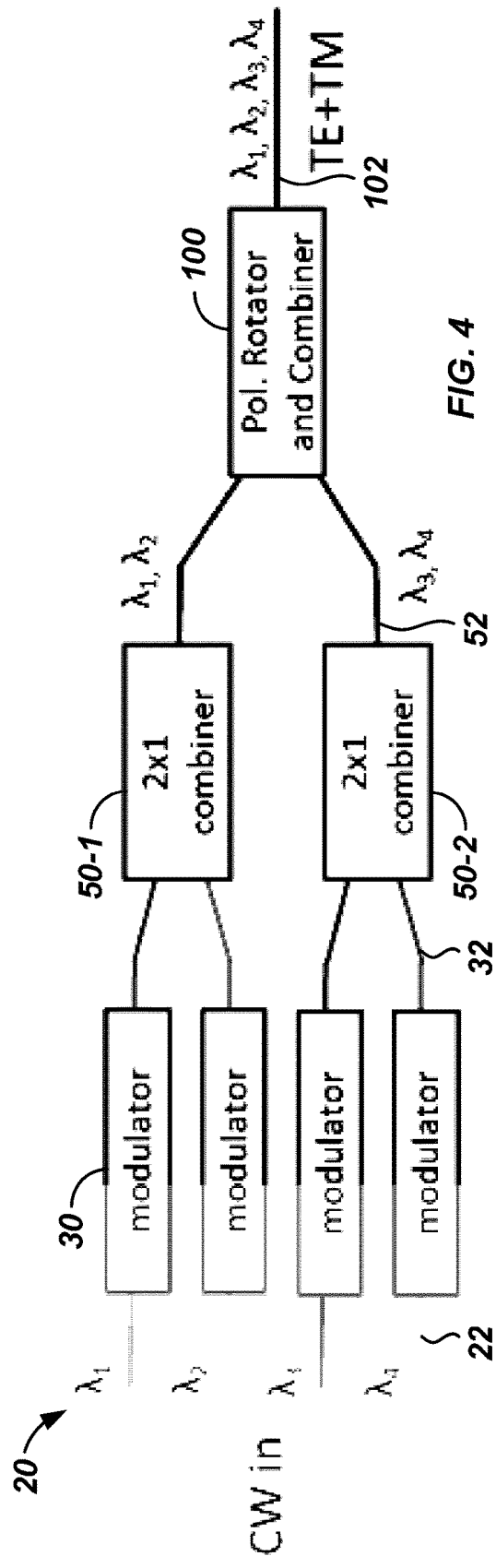
FIG. 3B
FIG. 4

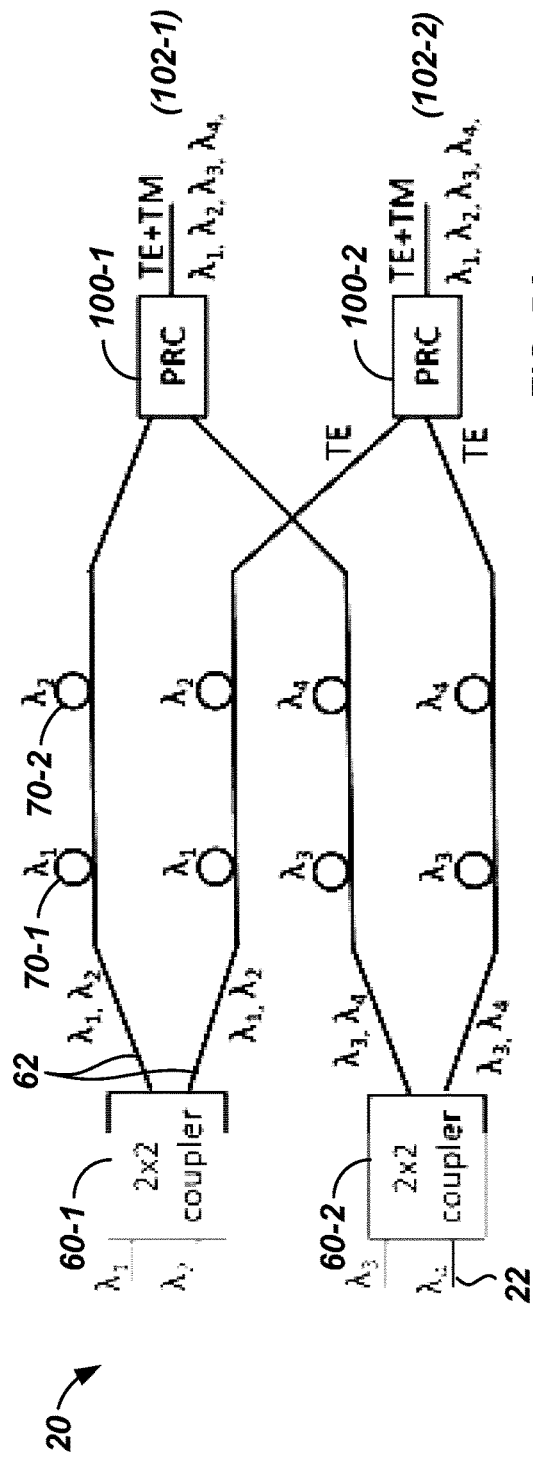
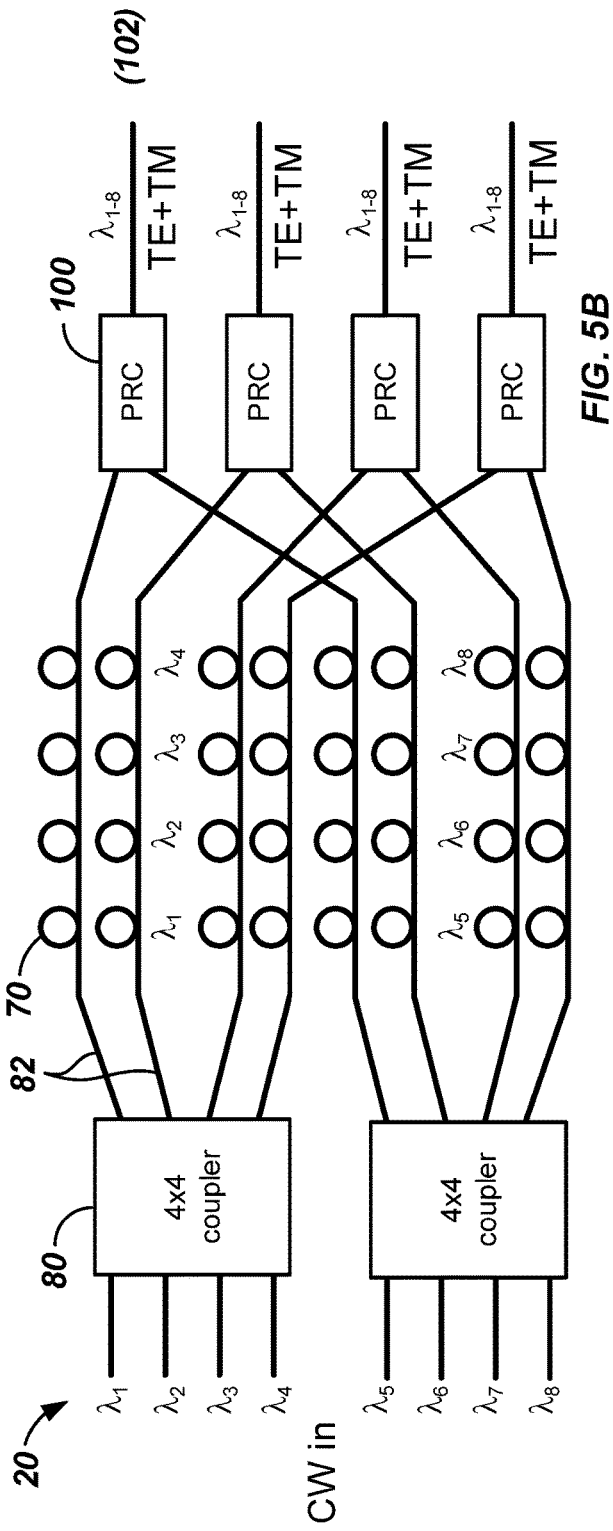
FIG. 5A
FIG. 5B

WAVELENGTH-DIVISION-MULTIPLEXING OPTICAL CIRCUIT IMPLEMENTED IN PHOTONIC INTEGRATED CIRCUIT FOR OPTICAL TRANSMITTER

BACKGROUND OF THE DISCLOSURE

Wavelength-division multiplexing (WDM) is a key technology used in high-capacity optical transceivers for the datacom and telecom industries. For example, an existing WDM transmitter used in an optical transceiver uses modulators to modulate continuous wave (CW) inputs that have different input wavelengths. A multiplexing (MUX) filter then combines all the wavelengths used in the implementation to produce an output optical signal having the input wavelengths. For instance, if there are N input wavelengths with channel spacing of $\Delta\lambda$ between them, the MUX filter is designed to combine all N of the input wavelengths with the channel spacing of $\Delta\lambda$ into an output optical signal. The MUX filter, therefore, has N inputs and at least one output.

Existing WDM optical transceivers that use a photonic integrated circuit (PIC) are becoming more prominent as the technology gets more and more mature. A PIC can integrate many optical elements together on a substrate wafer. Unfortunately, fabricating WDM filters used to multiplex or de-multiplex different wavelengths in a PIC can be challenging. For proper functioning, the WDM filters require very accurate dimensions of their optical waveguides. Very often, variations in the fabrication can significantly reduce the yield and performance that can be achieved with the WDM filters implemented in a PIC.

The subject matter of the present disclosure is directed to overcoming, or at least reducing the effects of, one or more of the problems set forth above.

SUMMARY OF THE DISCLOSURE

An optical circuit is disclosed herein for use with a plurality of N continuous wave signals having different wavelengths $\lambda_N$ at a channel spacing $\Delta\lambda$ from one another. The optical circuit comprises a modulation stage, a multiplexing stage, and a polarization rotator and combiner (PRC) stage. The modulation stage is configured to modulate the continuous wave signals to produce modulated signals, and the multiplexing stage is configured to combine either the continuous wave signals or the modulated signals to produce signal sets having separate groups of the different wavelengths. The PRC stage is disposed in optical communication with the multiplexing stage, and the PRC stage is configured to combine the signal sets into an output signal. The output signal has a first of the signal sets at a first polarization combined with a second of the signal sets at a second polarization orthogonal to the first polarization.

An optical transceiver is disclosed herein comprising an optical transmitter, an optical receiver, and processing circuitry. The optical transmitter has an optical circuit such as described above and is configured to transmit an output optical signal. The optical receiver is configured to receive an input optical signal, and the processing circuitry is in electrical communication with the optical transmitter and the optical receiver.

One optical circuit disclosed herein is for use with a plurality of N continuous wave signals having different wavelengths $\lambda_N$ at a channel spacing $\Delta\lambda$ from one another. The optical circuit comprises a plurality of modulators, two multiplexers, and a polarization rotator and combiner (PRC) device. Each modulator is configured to modulate one of the continuous wave signals. The two multiplexers disposed in optical communication with the modulators. Each multiplexer is configured to combine together a signal set of N/2 of the modulated signals, and each signal set has a separate group of the different wavelengths. The PRC device disposed in optical communication with the two multiplexers is configured to combine the signal sets into an output signal. The output signal has a first of the signal sets from a first of the multiplexers at a first polarization combined with a second of the signal sets from a second of the multiplexers at a second polarization orthogonal to the first polarization.

Another optical circuit disclosed herein is for use with a plurality of N continuous wave signals having different wavelengths $\lambda_N$ at a channel spacing $\Delta\lambda$ from one another. The optical circuit comprises a plurality of modulators, two power combiners, and a polarization rotator and combiner (PRC) device. Each modulator is configured to modulate one of the continuous wave signals. The two power combiners are disposed in optical communication with the modulators. Each power combiner is configured to combine together a signal set of N/2 of the modulated signals, and each signal set has a separate group of the different wavelengths. The PRC device disposed of in optical communication with the two power combiners is configured to combine the signal sets into an output signal. The output signal has a first of the signal sets from a first of the power combiners at a first polarization combined with a second of the signal sets from a second of the power combiners at a second polarization orthogonal to the first polarization.

Yet another optical circuit disclosed herein is for use with a plurality of N continuous wave signals having different wavelengths $\lambda_N$ at a channel spacing $\Delta\lambda$ from one another. The optical circuit comprises two power couplers, arrays of N/2 modulators, and polarization rotator and combiner (PRC) devices. Two power couplers are disposed in optical communication with the continuous wave signals. Each power coupler is configured to combine together N/2 of the continuous wave signals and is configured to output signal sets of the N/2 combined signals therefrom. The signal sets between the two power couplers have separate groups of the different wavelengths.

Each array of N/2 modulators is disposed in optical communication with a respective one of the signal sets of the N/2 combined signals from the two power couplers. Each of the N/2 modulators in a respective one of the arrays is configured to modulate different ones of the different wavelengths of the N/2 combined signals in the respective signal set. The PRC devices are each disposed in optical communication with the groups of the N/2 modulators. Each PRC device is configured to combine the signal sets into one of a plurality of output signals. Each of the output signals has a first half of the signal sets associated with a first of the power couplers at a first polarization combined with a second half of the signal sets associated with a second of the power couplers at a second polarization orthogonal to the first polarization.

The foregoing summary is not intended to summarize each potential embodiment or every aspect of the present disclosure.

BRIEF DESCRIPTION OF THE DRAWINGS

FIG. 1A illustrates a schematic view of an optical transmitter according to the present disclosure.

FIG. 1B illustrates a schematic view of an optical transmitter according to the present disclosure.

FIG. 3B illustrates another diagram of the first WDM optical circuit according to the present disclosure.

FIG. 4 illustrates a diagram of a second WDM optical circuit according to the present disclosure for use in an optical transmitter.

FIG. 5A illustrates a diagram of a third WDM optical circuit according to the present disclosure for use in an optical transmitter.

FIG. 5B illustrates another diagram of the third WDM optical circuit according to the present disclosure.

DETAILED DESCRIPTION OF THE DISCLOSURE

Figure 2:
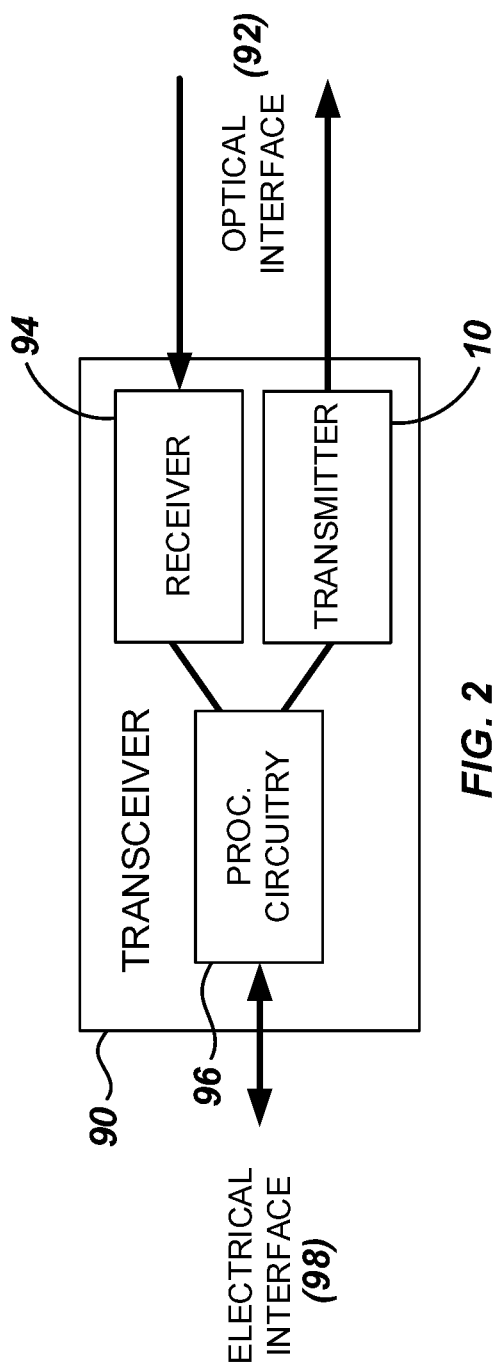
FIG. 2 illustrates a schematic view of an optical transceiver that uses the disclosed optical transmitter.

FIG. 1A schematically illustrates an optical transmitter 10 used to transmit optical signals in a network. As will be appreciated, the optical transmitter 10 can be used in an optical device, such as a transceiver that may also include an optical receiver (not shown). The optical transmitter 10 includes a source stage 12, a modulation stage 14, a multiplexing stage 16, and a polarization rotator and combiner (PRC) stage 18.

The source stage 12 has one or more laser sources and is configured to produce a plurality of continuous wave (CW) signals at different wavelengths. The modulation stage 14 modulates the continuous wave signals, and the multiplexing stage 16 combines the modulated signals to produce signal sets that have separate groups of the different wavelengths. The PRC stage 18 combines the signal sets into at least one output signal 17 for transmitting over the network. The output signal 17 has a first of the signal sets at a first polarization combined with a second of the signal sets at a second (orthogonal) polarization.

In some configurations, such as shown in FIG. 1B, the multiplexing stage 16 may be placed before the modulation stage 14. In that case, the multiplexing stage 16 combines CW signals from the source stage 12.

Elements of the optical transmitter 10 are implemented/fabricated in a photonic integrated circuit (PIC) 15, which is schematically outlined in a dashed box in FIGS. 1A-1B. For example, wavelength-division multiplexing (WDM) filters, power combiners, power couplers, waveguides, and other optical elements (not shown) used in the multiplexing stage 16 can be implemented/fabricated in the PIC 15. Likewise, polarization rotator and combiner (PRC) devices (not shown), waveguide, and other optical elements (not shown) used in the PRC stage 18 can also be implemented/fabricated in the PIC 15. Other features, including modulators in the modulation stage 14 and even features associated with the laser sources of the source stage 12 of the transmitter 10, can be implemented/fabricated in the PIC 15.

To reduce the difficulties encountered with existing arrangements, a multiplexing technique disclosed herein can significantly relax the fabrication requirements and can improve the fabrication tolerances for the multiplexing used in the PIC 15 for the optical transmitter 10. Accordingly, the disclosed technique constructs a wavelength-division-multiplexing (WDM) optical circuit for the optical transmitter 10 that allows for larger fabrication tolerances, which enables high yield and low cost, even when components are implemented/fabricated in the PIC 15.

In the wavelength multiplexing for the WDM transmitter 10 having at least four wavelengths, the disclosed wavelength multiplexing technique uses WDM filters, power combiners, or power couplers as a first stage for the multiplexing and uses a polarization rotator and combiner (PRC) device as a second stage for the multiplexing. In general, the PRC device includes a polarization rotator that has two inputs and includes a combiner that combines those polarized inputs into one output. During operation, the PRC device rotates the polarization of a first input to an orthogonal polarization and then combines that polarized input with a second input. In principle, the PRC device can be a lossless device. By allowing for larger fabrication tolerances while enabling high yield and low cost, the WDM filters, power combiners, or power couplers along with the PRC device can be implemented/fabricated in the PIC 15 of the optical transmitter 10.

As hinted above, the optical transmitter 10 disclosed herein can be used in an optical transceiver comparable to those used in datacom and telecom networks. Briefly, FIG. 2 illustrates a schematic view of an optical transceiver 90 that can have the disclosed optical transmitter 10. In addition to the transmitter 10, the transceiver 90 includes an optical interface 92, an optical receiver 94, processing circuitry 96, an electrical interface 98, and conventional circuitry. The optical receiver 94 receives optical signals through the optical interface 92 from the network, de-multiplexes the optical signals, and converts them to electrical signals for processing by the processing circuitry 19, which can then be communicated through the electrical interface 98. The receiver 94 can operate on the optical signals regardless of any polarization they may have.

For its part, the processing circuitry 96 receives electrical signals from the electrical interface 98 and converts them to drive signals for the transmitter 10. In turn, the transmitter 10 then outputs optical signals accordingly through the optical interface 92 for communication over the network. As disclosed herein, components of the optical transmitter 10 are implemented/fabricated in a photonic integrated circuit (PIC) based on the wavelength multiplexing techniques disclosed herein.

Figure 3A:
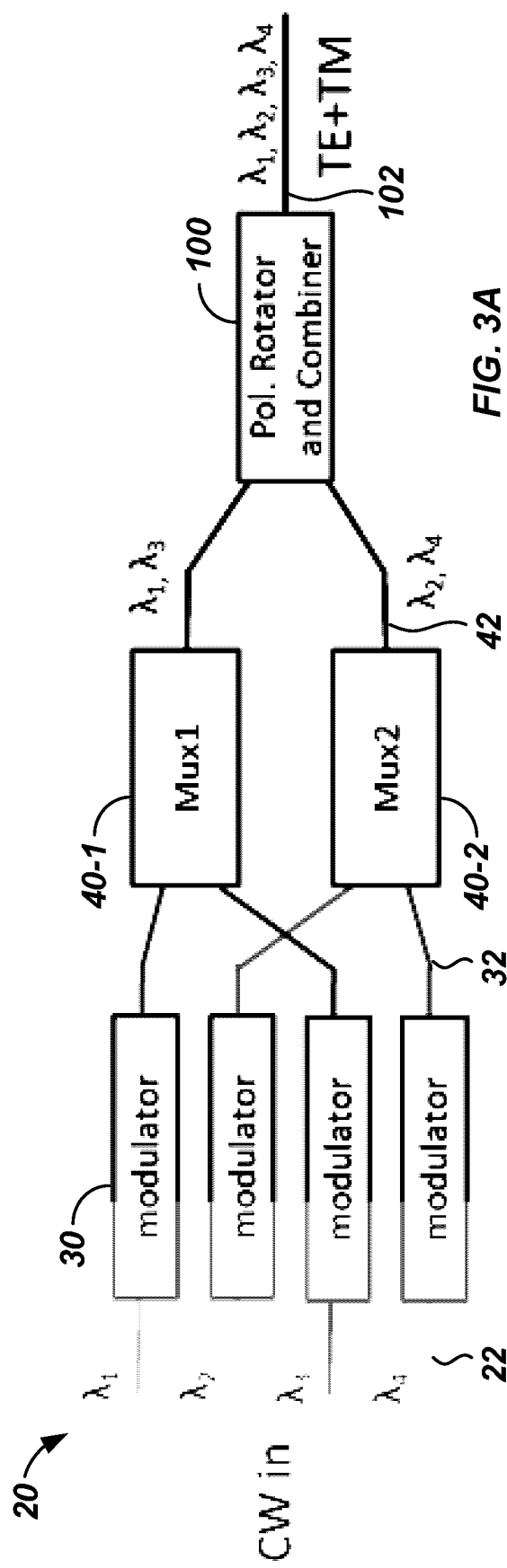
FIG. 3A illustrates a diagram of a first wavelength-division-multiplexing (WDM) optical circuit according to the present disclosure for use in an optical transmitter.

FIG. 3A illustrates a diagram of a first wavelength-division-multiplexing (WDM) optical circuit 20 based on the wavelength multiplexing techniques disclosed herein. The WDM optical circuit 20 includes modulators 30, first-stage MUX circuits 40, and a PRC device 100. As discussed herein, at least a portion of the WDM optical circuit 20 can be implemented as part of a photonic integrated circuit (PIC) for an optical transmitter according to the present disclosure. For example, the first-stage MUX circuits 40 and the PRC device 100 along with waveguides associated with them can be implemented in the PIC. The modulators 30 and other components can also be implemented in the PIC.

A plurality of N wavelengths $\lambda_{1-4}$ (at least four) are to be multiplexed in the optical circuit 20 for the optical transmitter. The wavelengths $\lambda_{1-4}$ are spaced at a channel spacing $\Delta\lambda$ from one another as is customary. For the N wavelengths, the first-stage MUX circuits 40 each combine together N/2 of the wavelengths $\lambda$ that have a channel spacing of at least $2\Delta\lambda$ into a signal set. Here, two signal sets have different groups of the wavelengths $(\lambda_1, \lambda_3)$ and $(\lambda_2, \lambda_4)$.

As shown in FIG. 3A, for example, four continuous wave (CW) signals at four different wavelengths $\lambda_{1-4}$ (shown here for simplicity) are communicated by connections 22 (e.g., waveguides) to modulators 30, which modulate the signals for communication along connections 32 (e.g., waveguides) to the first-stage MUX circuits 40. One of the first-stage MUX circuit 40-1 combines together the modulated signals for two of the wavelengths $\lambda_1, \lambda_3$ having the channel spacing of $2\Delta\lambda$ for a first signal set, and the other first-stage MUX circuit 40-2 combines together the modulated signals for the other two of the wavelengths $\lambda_2, \lambda_4$ having the channel spacing of $2\Delta\lambda$ for a second signal set.

The signal sets of the wavelengths $(\lambda_1, \lambda_3)$ and $(\lambda_2, \lambda_4)$ are then communicated by connections 42 (e.g., waveguides) to the PRC device 100 for combining together. The PRC device 100 is configured to combine the signal sets into an output signal. At the output 102, the optical signal has wavelengths $(\lambda_1, \lambda_3)$ for the first signal sets from the first MUX circuit 40-1 at a first polarization combined with those wavelengths $(\lambda_2, \lambda_4)$ for the second signal set from the second MUX circuit 40-2 at a second polarization orthogonal to the first polarization.

The modulators 30 can be implemented as Mach-Zehnder modulators, electro-absorption modulators, resonator modulators, directly modulated lasers, or other structures implemented in a PIC. The first-stage MUX circuits 40 can be implemented as an array waveguide grating (AWG), a thin-film filter, an echelle grating, cascaded Mach-Zehnder interferometers (MZI), or another structure implemented in a PIC. The PRC device 100 can be implemented as an adiabatic directional coupler, a taper-type mode converter, an adiabatic taper, or another structure implemented in a PIC.

As can be seen, each of the MUX circuits 40 only needs to combine N/2 wavelengths. This can significantly loosen the fabrication tolerances required to implement the WDM optical circuit 20 in a PIC because the MUX circuits 40 have fewer channels and have larger channel spacings between them, which requires less fabrication accuracy. Although only four wavelengths are shown in the example, the principles can be expanded to encompass more wavelengths by duplication of components.

For example, FIG. 3B illustrates another diagram of the first WDM optical circuit 20 of FIG. 3A expanded to encompass eight wavelengths $\lambda_{1-8}$. Eight modulators 30 are used. Each MUX filter 40 combines together four of the wavelengths $\lambda$ that have a channel spacing of $2\Delta\lambda$ (e.g., $\lambda_1, \lambda_3, \lambda_5, \lambda_7$ for MUX1 and $\lambda_2, \lambda_4, \lambda_6, \lambda_8$ for MUX 2). The PRC device 100 then combines together the signal sets so the wavelengths $(\lambda_1, \lambda_3, \lambda_5, \lambda_7)$ from the first MUX circuit 40-1 have an orthogonal polarization with respect to those wavelengths $(\lambda_2, \lambda_4, \lambda_6, \lambda_8)$ from the second MUX circuit 40-2.

In the previous embodiments, MUX filters 40 were used in a first multiplexing stage, and the PRC device 100 was used in a final multiplexing stage. In other embodiments, power combiners can be used in the first multiplexing stage.

For example, FIG. 4 shows a diagram of a second wavelength-division-multiplexing (WDM) optical circuit 20 based on the wavelength multiplexing techniques disclosed herein. This WDM optical circuit 20 includes modulators 30, power combiners 50, and a PRC device 100. As discussed herein, at least a portion of the WDM optical circuit 20 can be implemented as part of a photonic integrated circuit (PIC) for an optical transmitter according to the present disclosure. For example, the power combiners 50 and the PRC device 100 along with waveguides associated with them can be implemented in the PIC. The modulators 30 and other components can also be implemented in the PIC.

Again, a plurality of N wavelengths $\lambda_{1-4}$ (at least four) are to be multiplexed in the optical circuit 20 for the optical transmitter. The wavelengths $\lambda_{1-4}$ are spaced at a channel spacing $\Delta\lambda$ from one another as is customary. For the N wavelengths $\lambda_{1-4}$, the power combiners 50 each combine together N/2 of the wavelengths into a signal set.

As shown in FIG. 4, for example, four continuous wave (CW) signals at four different wavelengths $\lambda_{1-4}$ (shown here for simplicity) are communicated by connections 22 (e.g., waveguides) to modulators 30, which modulate the signals for communication along connections 32 (e.g., waveguides) to the power combiners 50. One of the power combiners 50-1 combines together two of the wavelengths $\lambda_1, \lambda_2$ having the channel spacing $\Delta\lambda$ into a first signal set, and the other of the power combiners 50-2 combines together the other two of the wavelengths $\lambda_3, \lambda_4$ having the channel spacing $\Delta\lambda$ into a second signal set. (Although the channel spacing between wavelengths of each power combiner 50 can be $\Delta\lambda$ as shown, it is possible that the channel spacing can instead be at least $2\Delta\lambda$ or greater.)

The signal sets of the wavelengths $(\lambda_1, \lambda_2)$ and $(\lambda_3, \lambda_4)$ are then communicated by connections 52 (e.g., waveguides) to the PRC device 100 for combining together. The PRC device 100 is configured to combine the signal sets into an output signal. At the PRC output 102, the optical signal has wavelengths $(\lambda_1, \lambda_2)$ for the first signal set from the first power combiner 50-1 at a first polarization combined with those wavelengths $(\lambda_3, \lambda_4)$ for the second signal set from the second power combiner 50-2 at a second polarization orthogonal to the first polarization.

The modulators 30 and the PRC device 100 can be implemented as noted previously. The power combiners 50 can be implemented as directional couplers, multimode interference couplers, adiabatic couplers, or other structures implemented in a PIC.

The power combiners 50 are broadband devices and can have large fabrication tolerances. This can significantly loosen the fabrication tolerances required to implement the WDM optical circuit 20 in a PIC. Yet, implementation of this WDM optical circuit 20 may need to account for excess insertion loss that may result from combining different wavelengths with the power combiners 50. Although only four wavelengths are shown in the example, the principles can be expanded to encompass more wavelengths by duplication of components. For example, additional modulators 30 can be added for additional channels. Likewise, several 2×1 power combiners 50 can be cascaded, or larger power combiners 50 can be used.

In the previous embodiments, MUX filters or power combiners were used in a first multiplexing stage, and the PRC device 100 was used in a final multiplexing stage. In other embodiments, power couplers can be used in the first multiplexing stage. Moreover, modulation of the wavelength channels can occur during stages of the multiplexing.

For example, FIG. 5A shows a diagram of a third wavelength-division-multiplexing (WDM) optical circuit 20 based on the wavelength multiplexing techniques disclosed herein. As discussed herein, at least a portion of the WDM optical circuit 20 can be implemented as part of a photonic integrated circuit (PIC) for an optical transmitter according to the present disclosure. For example, couplers 60, micro-ring modulators 70, and PRC devices 100 along with waveguides associated with them can be implemented in the PIC.

Again, a plurality of N wavelengths $\lambda_{1-4}$ (at least four) are to be multiplexed in the WDM optical circuit 20 for the optical transmitter. The wavelengths $\lambda_{1-4}$ are spaced at a channel spacing $\Delta\lambda$ from one another as is customary. For the N wavelengths $\lambda_{1-4}$, each of the 2×2 power couplers 60 combines and split two wavelengths into two signal sets.

As shown in FIG. 5A, for example, four continuous wave (CW) signals at four different wavelengths $\lambda_{1-4}$ (shown here for simplicity) are fed by connections 22 (e.g., waveguides) to two 2×2 power couplers 60. The 2×2 power couplers 60 combine and split the wavelengths $\lambda_{1-4}$ into four combined outputs for waveguides 62. After the 2×2 couplers 60, each output waveguide 62 contains CW signals with two of the wavelengths $\lambda_{1-2}$ and $\lambda_{3-4}$ having the channel spacing of $\Delta\lambda$. (Although the channel spacing between wavelengths of each power coupler 60 can be $\Delta\lambda$ as shown, it is possible that the channel spacing can instead be at least $2\Delta\lambda$ or greater.)

Two micro-ring modulators 70 on each waveguide 62 each modulates one of the respective two wavelengths $\lambda_{1-2}$ and $\lambda_{3-4}$. The micro-rings 70 can be implemented as micro-ring modulator arrays, and light at each wavelength is modulated by a respective modulator. The modulated outputs at each waveguide 62 thereby contain modulated signal sets for the two wavelengths $\lambda_{1-2}$ and $\lambda_{3-4}$. Other than micro-ring modulators 70, other types of resonator-based modulators can be used, including micro-disk modulators, photonic crystal cavity modulators, or other modulator structures.

Two PRC devices 100 then combine all the wavelengths $\lambda_{1-4}$ for the signal sets together. The output 102 of each PRC device 100 contains WDM signals in which two of the wavelengths are in a different (orthogonal) polarization with respect to the other two wavelengths. At the PRC output 102-1 from the first PRC device 100-1, for example, the optical signal at wavelengths $(\lambda_1, \lambda_2)$ from one waveguide 62 and modulators 70 associated with the first 2×2 coupler 60-1 has an orthogonal polarization with respect to those wavelengths $(\lambda_3, \lambda_4)$ from another waveguide 62 and modulators 70 associated with the second 2×2 coupler 60-2, as indicated by the TE and TM notations at outputs 102 in FIG. 5A.

The PRC output 102-2 from the second PRC device 100-2 can have a same or reverse polarization arrangement as the output 102-1 from the first PRC device 100-1. However, the modulation of the wavelengths for both outputs 102 will be different due to the different modulations performed by the different micro-ring modulators 70 used on the waveguides 62. Due to the different modulations, the different outputs 102-2 can be used for different end purposes.

The power couplers 60 can be implemented as directional couplers, multimode interference couplers, adiabatic couplers, or other structures implemented in a PIC. The PRC devices 100 can be implemented as noted previously.

The couplers 60 are broadband devices and can have large fabrication tolerances. This can significantly free up the fabrication tolerances required to implement the WDM optical circuit 20 in a PIC. Although only four wavelengths are shown in the example, the principles can be expanded to encompass more wavelengths by duplication of components.

For example, FIG. 5B illustrates another diagram of the third WDM optical circuit 20 of FIG. 5A expanded to encompass eight wavelengths $\lambda_{1-8}$. Two 4×4 power couplers 80 are used. Each of the four waveguides 82 from the 4×4 power couplers 80 includes groups of N/2 (i.e., four) micro-ring modulators 70. Additionally, four PRC devices 100 are used. The channel spacing between wavelengths of each power coupler 80 can be $\Delta\lambda$ as shown, but it is possible that the channel spacing can instead be at least $2\Delta\lambda$ or greater.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. An optical circuit for use with a plurality of N continuous wave signals having different wavelengths $\lambda_N$ at a channel spacing $\Delta\lambda$ from one another, the optical circuit comprising:
    a coupling stage being configured to combine the continuous wave signals to produce combined signal sets having separate groups of the different wavelengths;
    a modulation stage being configured to modulate the combined signal sets to produce modulated signal sets; and
    a polarization rotator and combiner (PRC) stage, disposed in optical communication with the modulation stage, configured to combine the modulated signal sets into at least one output signal having a first of the modulated signal sets at a first polarization combined with a second of the modulated signal sets at a second polarization orthogonal to the first polarization.

2. The optical circuit of claim 1, comprising a photonic integrated circuit having only the coupling stage implemented therein, having only the PRC stage implemented therein, or having both the coupling stage and the PRC stage implemented therein.

3. The optical circuit of claim 2, wherein the photonic integrated circuit further has the modulation stage implemented therein.

4. The optical circuit of claim 1, further comprising a source stage having one or more laser sources and being configured to generate the continuous wave signals.

5. The optical circuit of claim 1, wherein the coupling stage comprises a plurality of multiplexers, each configured to combine together at least two of the continuous wave signals having the different wavelengths at least spaced at twice the channel spacing from one another.

6. The optical circuit of claim 1, wherein the modulation stage comprises one or more modulators that are selected from the group consisting of a Mach-Zehnder modulator, an electro-absorption modulator, a resonator modulator, and a directly modulated laser; wherein the multiplexers are selected from the group consisting of an array waveguide grating, a thin-film filter, an echelle grating, and cascaded Mach-Zehnder interferometers; and wherein the PRC device is selected from the group consisting of an adiabatic directional coupler, a taper-type mode converter, or an adiabatic taper.

7. The optical circuit of claim 1, wherein the coupling stage comprises two power combiners, each configured to combine together N/2 of the continuous wave signals.

8. The optical circuit of claim 7, wherein each of the power combiners is configured to combine together the N/2 of the continuous wave signals having the different wavelengths at least spaced at twice the channel spacing from one another.

9. The optical circuit of claim 1,
    wherein the modulation and coupling stages comprise:
        two power couplers disposed in optical communication with the continuous wave signals, each of the power couplers being configured to combine together N/2 of the continuous wave signals and being configured to output the N/2 combined signals therefrom as one of the combined signal sets; and
        arrays of N/2 modulators, each array disposed in optical communication with a respective one of the combined signal sets from the two power couplers, each of the N/2 modulators in a respective one of the arrays being configured to modulate a respective wavelength λN of the N different wavelengths in the respective combined signal set; and wherein the PRC stage comprises two polarization rotator and combiner (PRC) devices each disposed in optical communication with the arrays of the N/2 modulators, each of the PRC devices being configured to combine the modulated signal sets into one of a plurality of output signals, each of the output signals having a first half of the combined signal sets associated with a first of the power couplers at the first polarization combined with a second half of the combined signal sets associated with a second of the power couplers at the second polarization.

10. The optical circuit of claim 9, wherein each of the power couplers is configured to combine together the N/2 of the continuous wave signals having the different wavelengths at least spaced at twice the channel spacing from one another.

11. The optical circuit of claim 9, wherein the power couplers are selected from the group consisting of a directional coupler, a multimode interference coupler, and an adiabatic coupler; wherein the modulators are selected from the group consisting of a micro-ring modulator, a resonator-based modulator, a micro-disk modulator, and a photonic crystal cavity modulator; and wherein the PRC device is selected from the group consisting of an adiabatic directional coupler, a taper-type mode converter, or an adiabatic taper.

12. An optical transceiver, comprising:
an optical transmitter having an optical circuit according to claim 1 and being configured to transmit an output optical signal;
an optical receiver being configured to receive an input optical signal; and
processing circuitry in electrical communication with the optical transmitter and the optical receiver.

13. The optical circuit of claim 1, wherein the coupling stage comprises two multiplexers disposed in optical communication with the plurality of modulators, each of the multiplexers being configured to combine together a signal set of N/2 of the continuous wave signals, each signal set having a separate group of the different wavelengths.

14. The optical circuit of claim 13, wherein each signal set has the separate group of the different wavelengths at least spaced at twice the channel spacing from one another.

15. The optical circuit of claim 1, wherein:
the modulation stage comprises at least two modulators;
for each of the N different wavelengths $\lambda_N$, each modulator applies a different modulation; and
the PRC stage is configured to combine the signal sets into at least two output signals, each of the output signals having each of the N different wavelengths having one of the different modulations.

* * * * *